United States Patent [19]
Lavelle et al.

[11] Patent Number: 5,469,151
[45] Date of Patent: Nov. 21, 1995

[54] REMOTE CONTROL CAR ALARM SYSTEM WITH WIRELESS MODULE INTERCONNECT

[75] Inventors: Patrick M. Lavelle, Sayville; John DiCroce, Oceanside; Thomas C. Malone, Miller Place, all of N.Y.

[73] Assignee: Audiovox Corporation, Hauppauge, N.Y.

[21] Appl. No.: 181,671

[22] Filed: Jan. 14, 1994

Related U.S. Application Data

[63] Continuation of Ser. No. 788,858, Nov. 7, 1991, abandoned.

[51] Int. Cl.$^6$ ........................................ H04Q 1/00
[52] U.S. Cl. .............................. 340/825.36; 340/825.31; 340/426; 307/10.2; 180/289
[58] Field of Search ................ 340/825.36, 825.32, 340/825.31, 825.34, 426, 428, 429, 539, 533; 307/10.2; 455/90; 180/289

[56] References Cited

U.S. PATENT DOCUMENTS

| | | | |
|---|---|---|---|
| 3,337,992 | 8/1967 | Tolson | 340/533 |
| 4,125,826 | 11/1978 | Rasmussen | 340/426 |
| 4,187,497 | 2/1980 | Howell | 340/429 |
| 4,232,288 | 11/1980 | Masterman | 340/428 |
| 4,240,516 | 12/1980 | Henderson | 180/289 |
| 4,257,038 | 3/1981 | Rounds | 340/426 |
| 4,267,547 | 5/1981 | Sugiyama | 340/429 |
| 4,733,638 | 3/1988 | Anderson | 340/426 |
| 4,924,206 | 5/1990 | Ayers | 340/426 |
| 4,933,664 | 6/1990 | Igawa | 340/426 |
| 4,935,745 | 6/1990 | Mori | 455/90 |
| 4,952,908 | 8/1990 | Sanner | 340/429 |
| 4,987,406 | 1/1991 | Reid | 340/426 |
| 4,996,515 | 2/1991 | Schaffer | 340/426 |
| 5,045,837 | 9/1991 | Gosker | 340/426 |

*Primary Examiner*—Donald J. Yusko
*Assistant Examiner*—Brian Zimmerman
*Attorney, Agent, or Firm*—Rosenman & Colin

[57] ABSTRACT

An easy-to-install automotive security system mounts a siren assembly in the engine compartment and a sensor assembly in the passenger compartment. The assemblies are in wireless, radio frequency communication, thereby eliminating wires extending between the compartments.

19 Claims, 4 Drawing Sheets

REMOTE CONTROL CAR ALARM SYSTEM WITH WIRELESS MODULE INTERCONNECT

CROSS-REFERENCE

This is a continuation of Ser. No. 07/788,858 filed Nov. 7, 1991 now abandoned.

BACKGROUND OF THE INVENTION

1. Field of the Invention

This invention generally relates to an automotive security system and, more particularly, to an easy-to-install system requiring no electrical wiring extending between the engine and passenger compartments of a vehicle.

2. Description of Related Art

Automotive security systems are well known. A siren is installed on the vehicle, typically in the engine compartment, and sensors electrically connected to the siren are installed at critical locations on the vehicle, typically at the doors, the hood, the trunk and the windows. When an attempt is made to vandalize or steal the vehicle, at least one of the sensors detects the attempt and activates the siren. It is also well known to remotely arm and disarm such systems by activation of portable transmitters.

Although generally satisfactory for their intended purpose, the known systems are typically installed by skilled automotive technicians. Mechanical and electrical expertise are required to perform the basic security system installation. Such expertise is generally beyond the skills possessed by the average consumer, and contributes to the overall high cost of installing such security systems.

SUMMARY OF THE INVENTION

1. Objects of the Invention

It is a general object of this invention to minimize the skills required to install an automotive security system.

Another object of this invention is to reduce the expense involved in installing an automotive security system.

Still another object of this invention is to provide an automotive security system that is easy to install and operate.

2. Features of the Invention

In keeping with these objects and others which will become apparent hereinafter, one feature of this invention resides, briefly stated, in a security system for a vehicle having passenger and engine compartments, including sensor means mounted in the passenger compartment and siren means mounted in the engine compartment. The sensor means includes a transmitter module operative for sensing a security compromising event, and for transmitting an electrical alarm signal in response to such sensing. The siren means includes a receiver module operative for receiving the electrical alarm signal, and for sounding an alarm in response to such receiving.

In accordance with one aspect of this invention, the modules are in wireless, radio frequency communication with each other. There is no hard-wired electrical connection between the modules. This greatly simplifies the installation, because no wires need extend through or past the fire wall separating the passenger and engine compartments of the vehicle.

More particularly, the sensor means advantageously includes a voltage detector plugged into the vehicle's cigarette lighter receptacle or directly connected to the vehicle's fuse block. The voltage detector can sense the drop in the vehicle's battery voltage when a car light is illuminated. For example, a dome or door light is illuminated when one of the car doors is opened. One of these lights typically consumes from about one to ten watts of power. The voltage detector, in a preferred embodiment, can sense a power usage of about three to five watts. The sensitivity of the voltage detector is adjustable.

In addition, the voltage detector can detect a lack of voltage being externally supplied to the sensor means. In the event that power is interrupted to the sensor means, for example, due to a compromising event, a back-up battery on-board the sensor means transmits the alarm signal to the siren means and causes the alarm to be sounded.

Optionally, the sensor means advantageously includes a shock detector operative for detecting shocks imparted to the vehicle, typically by the shattering of a window. The sensitivity of the shock detector is also adjustable.

The sensor means is armed or disarmed remotely by operation of a hand-held or key chain-mounted transmitter carried by the driver. Once armed, whenever the voltage and/or shock detector detects a security compromising event, i.e. a door opened, a window broken, etc., then the sensor means transmits the alarm signal, and the siren means receives the alarm signal and sounds the alarm.

The electrical alarm signal is transmitted by a transmitting antenna on-board the sensor means, and is received by a receiving antenna on-board the siren means. The alarm signal is encoded with a code, unique for each vehicle, by the sensor means, and is decoded by the siren means.

The installation is further simplified by providing a magnetic mount for the siren means which is detachably installed on any available metal surface in the engine compartment. The sensor means is detachably mountable at any convenient place within the passenger compartment, e.g. on the sun visor by means of a clip, or on or underneath the dashboard by means of a hook-and-loop-type fastener, etc.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 6 is a block diagram of the transmitter module within the sensor assembly, including a portable transmitter for

DETAILED DESCRIPTION OF THE PREFERRED EMBODIMENTS

Figure 5:
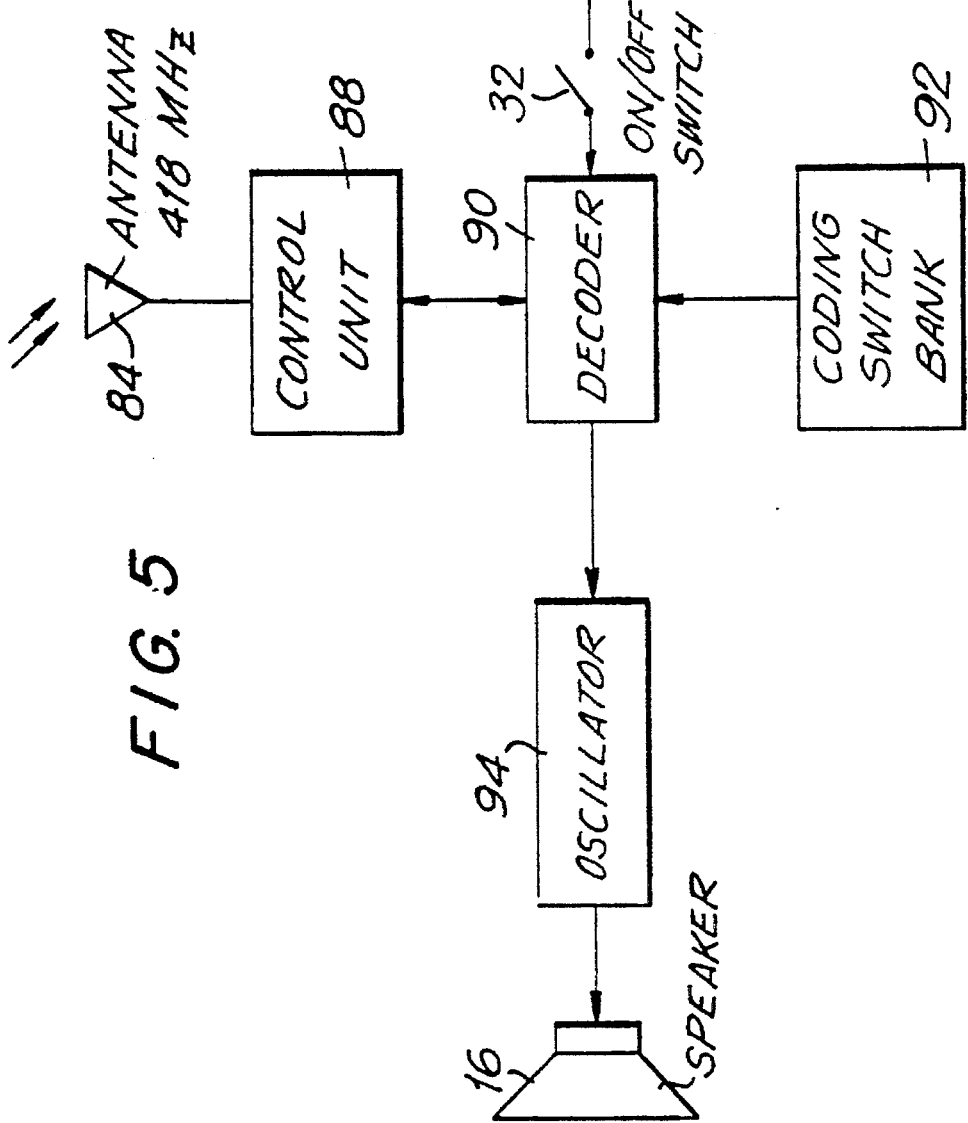
FIG. 5 is a block diagram of the receiver module within the siren assembly.

Referring now to the drawings, reference numerals 10 and 12 respectively identify the siren and sensor assemblies of the security system for use in a vehicle having an engine compartment and a passenger compartment. The siren assembly 10 includes a housing 14 containing a speaker 16 (see FIG. 5). A bifurcated mounting bracket 18 having a bottom magnetic mount 20 pivotally supports the siren housing 14 on any available smooth, flat, metal surface 24 underneath the vehicle's hood within the engine compartment, preferably away from heat and moving parts, but within a few feet of the vehicle's main battery 22. Electrical cables 26, 28 from the siren housing are respectively connected to the plus and minus terminals of the battery 22 by alligator clips. A fuse 30 is connected in series along the positive cable 26. An on/off switch 32 allows the battery 22, or a back-up battery, to power the siren assembly. The housing 14 preferably faces down toward the ground to prevent it from collecting water. A receiver module, as depicted in FIG. 5, is mounted within the siren housing 14.

Figure 2:
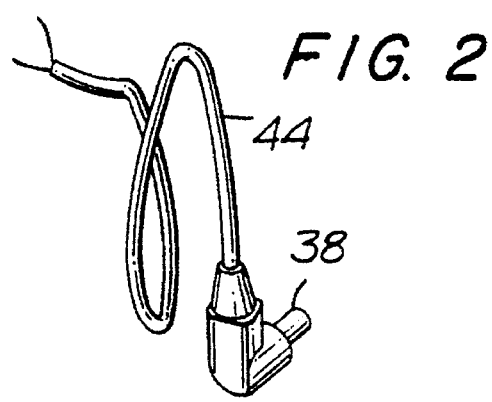
FIG. 2 is a perspective view of an alternate way of electrically connecting the sensor assembly.
Figure 6:
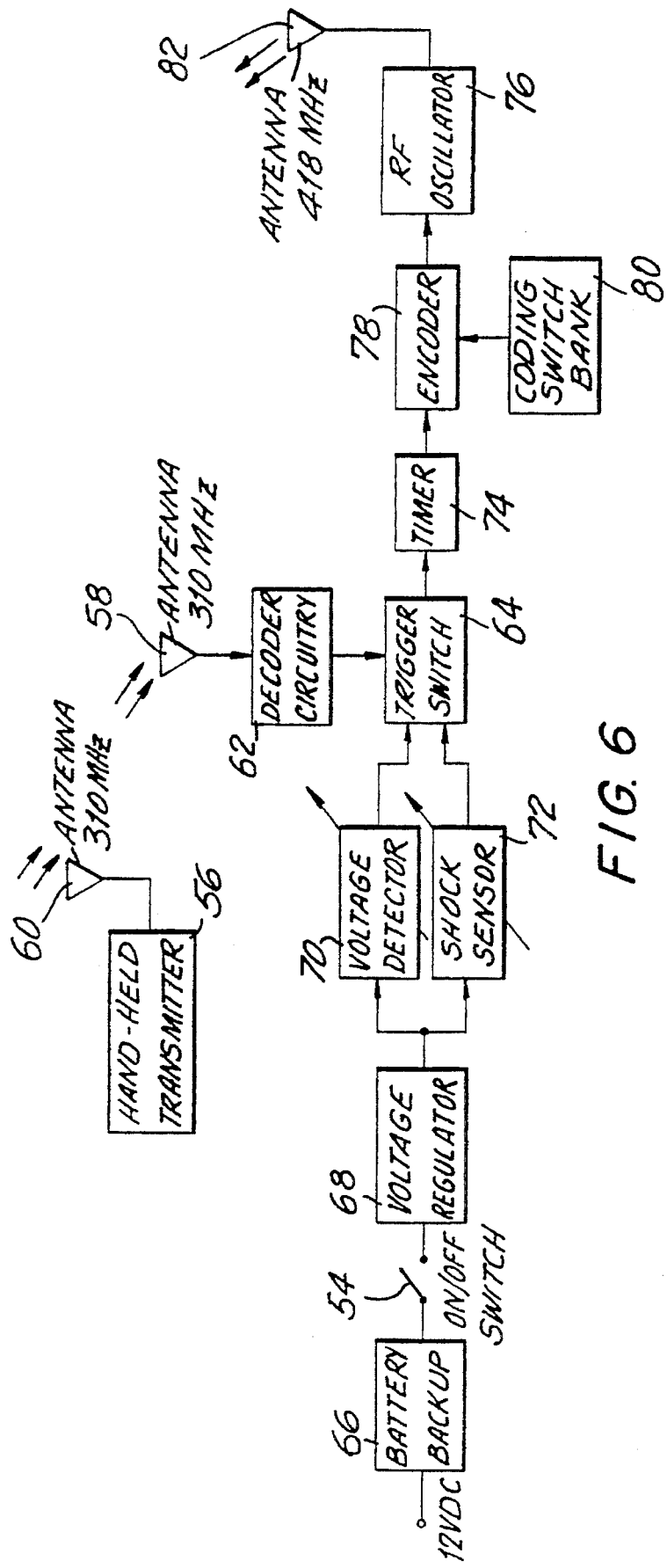

The sensor assembly 12 also includes a housing 34 having a transmitter module, as depicted in FIG. 6, mounted therein. The sensor housing 34 has a socket 36 for receiving an electrical plug 38. The plug 38 is connected at one end of a coiled cable 40, whose other end is connected to a cigarette lighter connector 42 for insertion into a standard cigarette lighter receptacle of the vehicle. Alternatively, as shown in FIG. 2, the plug 38 is connected by a twin-lead cable 44 having bared ends to a fuse block of the vehicle. Both the cigarette lighter receptacle and the fuse block provide a constant voltage (12 v DC) even when the ignition key of the vehicle is in the OFF position. Hence, the sensor assembly is powered, even when the vehicle is shut down. The siren assembly is always powered due to its direct connection to the vehicle battery 22.

Figure 3:
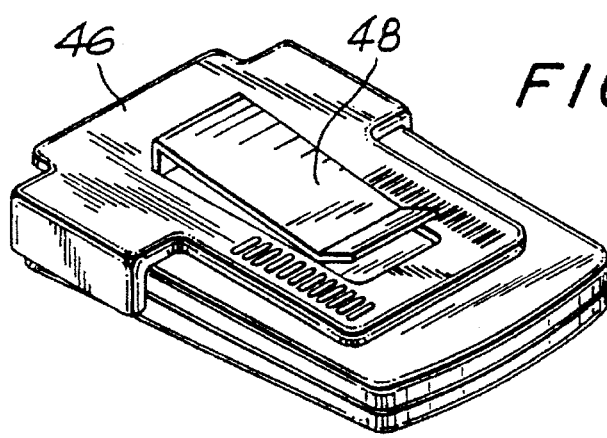
FIG. 3 is a perspective view of one way of mounting the sensor assembly in the passenger compartment.
Figure 4:
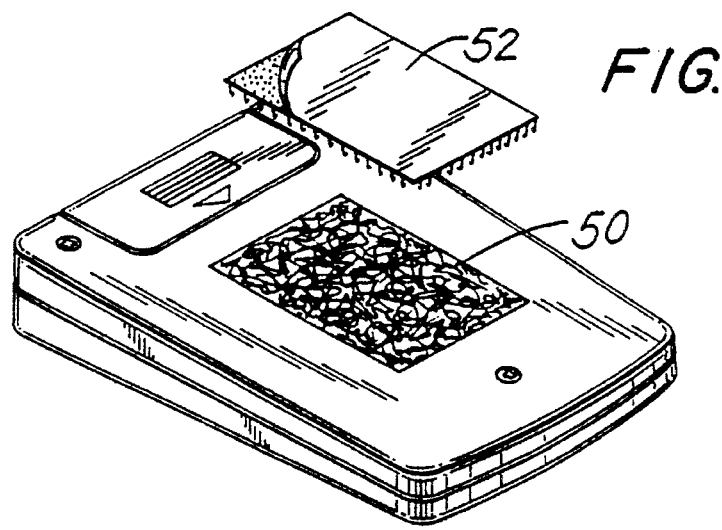
FIG. 4 is a perspective view of another way of mounting the sensor assembly in the passenger compartment.

The sensor housing 34 is mounted in the passenger compartment at any convenient location. For example, a holder 46 having a clip 48, as shown in FIG. 3, is used to support the sensor housing 34 from a sun visor. Alternatively, as shown in FIG. 4, a first hook fastener 50 is adhered to the sensor housing 34, and a second loop fastener 52 is adhered to any convenient spot on or underneath the vehicle dashboard. The detachable hook-and-loop-type connection provides an easy installation. Once installed, an on/off switch 54 on the housing enables the sensor assembly to be powered from both the main battery or a back-up battery.

As best shown in FIG. 6, a hand-held or keychain-mounted transmitter 56 is operative for remotely arming and disarming the system from up to 15 feet away by transmitting a radio frequency signal to the sensor assembly 12. The signal is encoded with a unique code. In the preferred embodiment, the transmitter 56 has a button which, when momentarily depressed once, transmits a 310 MHz signal to arm the sensor assembly. When the button is pressed again, the sensor assembly is disarmed.

The sensor assembly includes an antenna 58 for receiving the arming/disarming signal transmitted by antenna 60. The arming/disarming signal is decoded by decoder circuitry 62 and conducted to a trigger switch 64, typically a flip-flop device having two states.

The 12 v DC signal is conducted to a battery back-up power supply 66, e.g. a 9 v battery, and through the on/off switch 54 before being regulated by voltage regulator 68. The regulated voltage is conducted to an adjustable voltage detector 70 and, optionally, an adjustable shock detector 72. The detector 70 detects a voltage drop in the vehicle battery voltage, typically caused by illumination of a door light, dome light, hood light, trunk light, etc. consuming 1–10 watts of power. The detector 72 detects shocks above a certain threshold. The detectors 70, 72 include potentiometers having respective controls at the exterior of the sensor housing 34 so that the voltage drop and shock threshold levels can be set.

The detector 70 also detects a lack of voltage being supplied to the sensor assembly. For example, if either cable 40 or cable 44 is disconnected from the cigarette lighter receptacle or the fuse block, on the one hand, or from the sensor assembly on the other hand, then the detector 70, now deprived of power from the main battery, is powered by the back-up battery 66.

The detectors 70, 72 are connected to the trigger switch 64. In the event of theft or vandalism, the detectors 70, 72 generate an electrical signal to trip the trigger switch 64 from its rest state to its alarm state. The switch 64 triggers a timer 74 and, in turn a radio frequency oscillator 76 operative for generating an electrical alarm or carrier signal. In the preferred embodiment, the carrier signal frequency is 418 MHz and is generated for about one minute. The alarm signal is encoded by encoder 78 with a unique code set in advance by a bank 80 of coding switches. The encoded alarm signal is broadcast over the air by transmitting antenna 82.

The range of the transmitter module is about 3 meters, sufficient to be received by a receiving antenna 84 (see FIG. 5) of the siren assembly. The siren assembly, as previously stated, is connected to the vehicle battery 22. In the event the battery 22 fails or is disconnected, a rechargeable battery 86 serves to provide auxiliary power. The siren assembly is turned on and off by the aforementioned on/off switch 32. A control circuit 88 scans the airwaves searching for the encoded alarm signal. The speaker 16 is quiet in the absence of receipt of the encoded alarm signal. However, in the event of a security compromising event in which the encoded alarm signal is received by the antenna 84, the encoded alarm signal is conducted to a decoder 90 connected to a bank 92 of coded switches in which is stored the same code as was set by the bank 80. Upon a successful matching of the codes, an output signal is sent to an oscillator 94 for driving the speaker 16.

The security system is extremely easy to install and operate. It is merely necessary to magnetically mount the siren assembly in the engine compartment and connect the cables 26, 28 to the battery 22. The siren assembly is activated by turning on the switch 32. The siren assembly can also be screwed into any available support in the engine compartment.

Figure 1A:
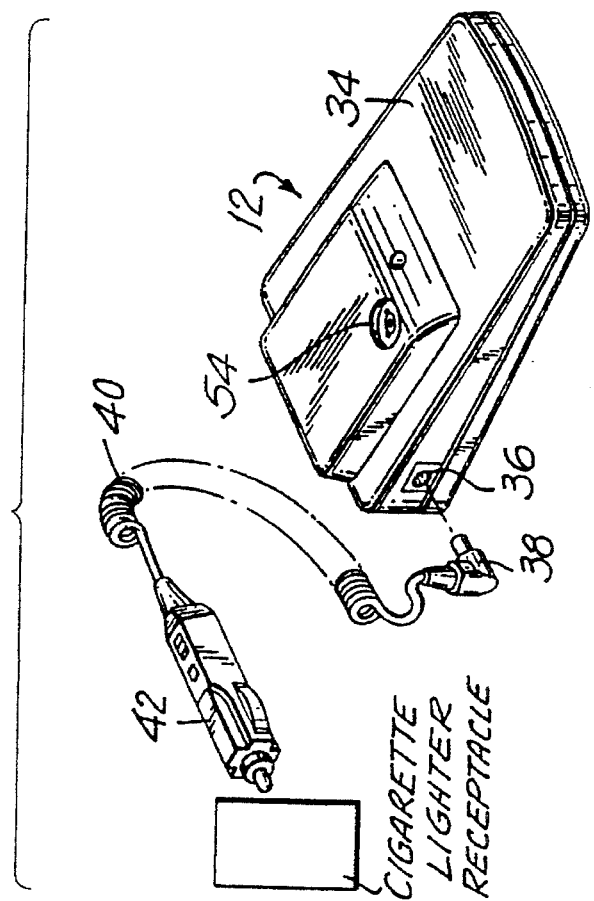
FIG. 1A is a broken away perspective view of the sensor assembly mounted in the passenger compartment of the vehicle.
Figure 1B:
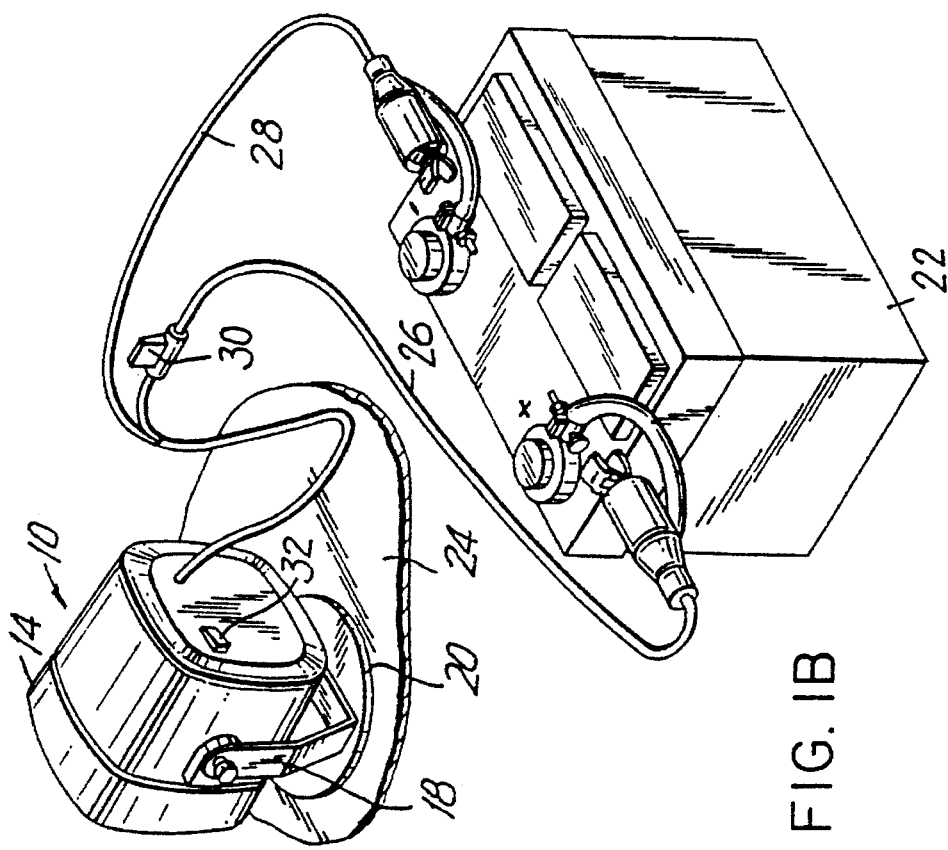
FIG. 1B is a broken away perspective view of the siren assembly mounted in the engine compartment of the vehicle.

As for the sensor assembly, it can either be clipped on the sun visor (FIG. 3) or detachably mounted at any convenient location within the passenger compartment by a complementary pair of adhesive-backed hook-and-loop fasteners (FIG. 4). The sensor assembly can be electrically connected to the cigarette lighter receptacle (FIG. 1) or the fuse block (FIG. 2).

All of the physical and electrical connections are simple to effect without requiring expertise. The wireless communication between the sensor and siren assemblies eliminates any hard-wiring between the engine and passenger compartments.

It will be understood that each of the elements described above, or two or more together, also may find a useful application in other types of constructions differing from the types described above.

While the invention has been illustrated and described as embodied in a remote control car alarm system with wireless module interconnect, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A security system for deterring a security breach in an unattended vehicle having passenger and engine compartments, comprising:
    a) sensor means for sensing a security compromising event and including timer means and a transmitter module for transmitting a wireless signal having a predetermined length in response to said sensed event;
    b) means for interiorly mounting the sensor means within the passenger compartment;
    c) siren means, including a receiver module having a receiving antenna for receiving said wireless signal, and for sounding an alarm in response to receiving said wireless signal; and
    d) means for interiorly mounting the siren means within the engine compartment.

2. The system according to claim 1, wherein the sensor means includes a voltage detector for detecting a drop in vehicle battery voltage.

3. The system according to claim 2, wherein the sensor means includes means for adjusting the voltage drop detected by the voltage detector.

4. The system according to claim 1, wherein the sensor means includes a shock detector unit for detecting shocks imparted to any part of the vehicle.

5. The system according to claim 4, wherein the sensor means includes means for adjusting the magnitude of the shock detected by the shock detector.

6. The system according to claim 1, wherein the siren means includes an on-board antenna for receiving the wireless signal provided by said sensor means.

7. The system according to claim 1 wherein said sensor means further includes auxiliary power means for supplying electrical power in the event that the vehicle battery does not supply power.

8. The system according to claim 1, wherein the sensor means includes an on-board antenna for transmitting the wireless signal to said siren means.

9. The system according to claim 1 further comprising:
    means for remotely arming and disarming the sensor means, including a portable transmitter for transmitting radio frequency arming and disarming signals on a carrier frequency distinct from the carrier frequency of the wireless signal provided by said sensor means and an arming/disarming antenna on-board the sensor means for receiving said arming and disarming signals.

10. The system according to claim 1, wherein the means for mounting the sensor means includes a clip for detachably mounting the sensor means to a sun visor in the passenger compartment.

11. The system according to claim 1, wherein the means for mounting the sensor means includes hook-and-loop fastener means for detachably mounting the sensor means on a dashboard in the passenger compartment.

12. The system according to claim 1, wherein the sensor means is adapted to operate on power supplied by the vehicle cigarette lighter receptacle.

13. The system according to claim 1, wherein the sensor means is adapted to operate on power supplied by the vehicle fuse block.

14. The system according to claim 13, wherein said sensor means further includes auxiliary power means for supplying electrical power in the event that the vehicle battery does not supply power.

15. The system according to claim 1, wherein the siren means is adapted to be electrically connected to a vehicle battery, and includes a rechargeable power means adapted for supplying electrical power in the event that the vehicle battery does not supply power.

16. The system according to claim 1, wherein the means for mounting the siren means includes a magnetic mount for detachably connecting the siren means on a metal support.

17. The system for a vehicle according to claim 1, wherein said predetermined length is one minute long.

18. The system according to claim 1, wherein said transmitter module transmits a first wireless signal having a first predetermined code and said receiver module sounds said alarm in response to a second wireless signal having a second predetermined code said system further comprising:
    means for selectably determining one of said first and second codes so that the first code that said transmitter transmits matches said second code.

19. The system according to claim 2, wherein said vehicle battery voltage drop is a voltage drop produced by actuation of an electric accessory connected to said vehicle battery.

* * * * *